(12) United States Patent
Belton, Jr. et al.

(10) Patent No.: US 11,281,797 B1
(45) Date of Patent: *Mar. 22, 2022

(54) PROFILE MANAGEMENT

(71) Applicant: Wells Fargo Bank, N.A., San Francisco, CA (US)

(72) Inventors: Lawrence T. Belton, Jr., Charlotte, NC (US); Jennifer Imus, North Pole, AK (US); Tyra Frison, Charlotte, NC (US); Deb J. Sante, Wolcott, CO (US); Tammy Fleming, Maple Grove, MN (US); Melissa Nicoletti, Gastonia, NC (US); Ryan B. Benskin, Charlotte, NC (US); Kristina Draper, Cave Creek, AZ (US); Timothy H. Morris, Lexington, NC (US); Peter A. Makohon, Huntersville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 16/551,308

(22) Filed: Aug. 26, 2019

Related U.S. Application Data

(63) Continuation of application No. 15/959,948, filed on Apr. 23, 2018, now Pat. No. 10,395,057, which is a
(Continued)

(51) Int. Cl.
  *G06F 16/9535* (2019.01)
  *G06F 21/62* (2013.01)
  *G06F 16/2455* (2019.01)

(52) U.S. Cl.
  CPC .... *G06F 21/6245* (2013.01); *G06F 16/24564* (2019.01); *G06F 16/9535* (2019.01); *G06F 21/6218* (2013.01)

(58) Field of Classification Search
  None
  See application file for complete search history.

(56) References Cited

U.S. PATENT DOCUMENTS

| | | |
|---|---|---|
| 7,263,529 B2 | 8/2007 | Cordery et al. |
| 7,269,590 B2 | 9/2007 | Hull et al. |
| (Continued) | | |

FOREIGN PATENT DOCUMENTS

| | | |
|---|---|---|
| WO | 2012178130 A2 | 12/2012 |

OTHER PUBLICATIONS

Loren Terveen et al., Social Matching: A Framework and Research Agenda, ACM Digital Library, ACM Transactions on Computer-Human Interaction, Sep. 2005, vol. 12, Issue 3, http://dl.acm.org/citation.cfm?id=1096740.

*Primary Examiner* — Son T Hoang
(74) *Attorney, Agent, or Firm* — Kilpatrick Townsend & Stockton LLP

(57) ABSTRACT

In one or more embodiments, a first entity may create a profile by providing content via an interface or a first interface. A second entity may manage one or more aspects of the profile via a second interface. The amount of control the second entity has over one or more portions of the profile may be related to or based on content of the profile or a relationship between the first entity and the second entity. For example, the second entity may screen content of the profile from public view. Additionally, profiles may be searched internally within an organization or externally, such as for outsourcing or to provide vendors or clients with more customized solutions. In this manner, profile management is provided.

20 Claims, 6 Drawing Sheets

Related U.S. Application Data continuation of application No. 14/275,395, filed on May 12, 2014, now Pat. No. 9,984,251.

(56) References Cited

U.S. PATENT DOCUMENTS

| | | | |
|---|---|---|---|
| 7,467,212 B2 | 12/2008 | Adams et al. | |
| 9,984,251 B2 | 5/2018 | Belton et al. | |
| 10,395,057 B1 | 8/2019 | Belton, Jr. et al. | |
| 2004/0044696 A1 | 3/2004 | Frost | |
| 2004/0268137 A1* | 12/2004 | Kouznetsov | G06F 16/95 |
| 2005/0038876 A1 | 2/2005 | Chaudhuri | |
| 2005/0131830 A1* | 6/2005 | Juarez | G06F 16/9535 |
| 2005/0165797 A1* | 7/2005 | Nair | G06F 16/9535 |
| 2006/0047725 A1 | 3/2006 | Bramson | |
| 2006/0136419 A1 | 6/2006 | Brydon et al. | |
| 2007/0030824 A1* | 2/2007 | Ribaudo | G06F 16/95 |
| 2008/0133716 A1 | 6/2008 | Rao et al. | |
| 2008/0215897 A1* | 9/2008 | Doyle | G06F 16/24564 |
| 2008/0306956 A1* | 12/2008 | Werthessen | G06F 16/9535 |
| 2009/0063646 A1 | 3/2009 | Mitnick | |
| 2009/0138546 A1* | 5/2009 | Cruzada | G06F 16/24564 |
| 2009/0313074 A1 | 12/2009 | Harpur et al. | |
| 2010/0153288 A1 | 6/2010 | Digiambattista et al. | |
| 2010/0174578 A1 | 7/2010 | Duffy et al. | |
| 2011/0161666 A1 | 6/2011 | Gladwin et al. | |
| 2011/0276507 A1 | 11/2011 | O'Malley | |
| 2011/0276563 A1* | 11/2011 | Sandoval | G06F 16/23 707/723 |
| 2011/0289011 A1 | 11/2011 | Hull et al. | |
| 2012/0066579 A1 | 3/2012 | Joshi | |
| 2012/0109837 A1 | 5/2012 | Sahagun et al. | |
| 2012/0116897 A1* | 5/2012 | Klinger | G06F 16/95 |
| 2012/0158792 A1 | 6/2012 | MacLaurin et al. | |
| 2012/0185486 A1 | 7/2012 | Voigt et al. | |
| 2012/0238285 A1* | 9/2012 | Yariv | G06F 16/90 |
| 2012/0246231 A1* | 9/2012 | Norena | G06F 16/381 |
| 2012/0311462 A1 | 12/2012 | Devecka | |
| 2013/0046704 A1* | 2/2013 | Patwa | G06F 16/9535 |
| 2013/0086078 A1 | 4/2013 | Malleshaiah | |
| 2013/0185368 A1 | 7/2013 | Nordstrom et al. | |
| 2013/0282504 A1 | 10/2013 | Lessin et al. | |
| 2013/0282605 A1 | 10/2013 | Noelting | |
| 2013/0304763 A1* | 11/2013 | Esposito | G06F 16/00 707/783 |
| 2013/0318035 A1 | 11/2013 | Swanson et al. | |
| 2014/0019542 A1 | 1/2014 | Rao et al. | |
| 2014/0136996 A1* | 5/2014 | Boozer | G06F 16/245 |

* cited by examiner

PROFILE MANAGEMENT

CROSS-REFERENCE TO RELATED APPLICATION

This application is a continuation U.S. patent application Ser. No. 15/959,948, entitled "PROFILE MANAGEMENT," and filed Apr. 23, 2018 (now patent Ser. No. 10/395,057, issued Aug. 27, 2019), which is a continuation of U.S. patent application Ser. No. 14/275,395, entitled "PROFILE MANAGEMENT," and filed on May 12, 2014 (now U.S. Pat. No. 9,984,251, issued May 29, 2018). The entireties of the above-noted patent applications are incorporated herein by reference.

BACKGROUND

Generally, there is a lack of automated solutions for supporting mentoring or bringing one or more individuals together. For example, in a business environment, it may be desirable to establish a mentorship between a mentor and a mentee. A mentorship may be a personal development relationship where a mentor guides a mentee to grow as an individual, an employee, or as a person. A mentor may be more experienced or more knowledgeable than a mentee, who may be less experienced or less knowledgeable about one or more topics, career related subject matter, life, intricacies of an organization, other details, etc. Often, mentors may be matched with their respective mentees by a mentoring committee, members of human resources, etc.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

One or more embodiments of techniques or systems for profile management are provided herein. In one or more embodiments, a first entity may create a profile (e.g. pertaining primarily to the first entity) by providing content, data, or information associated with his or her profile. A second entity may manage (e.g., edit, create, add, remove, modify, control access, etc.) one or more aspects of the profile via a second interface. The amount of control the second entity has over one or more portions of the profile may be related to or based on content of the profile or a relationship between the first entity and the second entity. For example, if the second entity is an employer of the first entity, the second entity may screen content of the profile from public view based on whether or not content has been released to the public or to one or more other entities. For example, internally within an organization, it may be desirable for an individual (e.g., first entity) to notify internal team members of projects or details which are generally considered confidential. Externally, it may not be desirable for the organization to discuss details of these projects to other entities. However, it may be beneficial to discuss high level aspects of such projects. To this end, a profile may be searched internally within an organization (e.g., and provide full or greater access) or externally (e.g., which when searched, provides less access than the internal search), such as for outsourcing or to provide vendors, suppliers, funding sources, human capital, or clients with more customized solutions. In this manner, profile management is provided.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
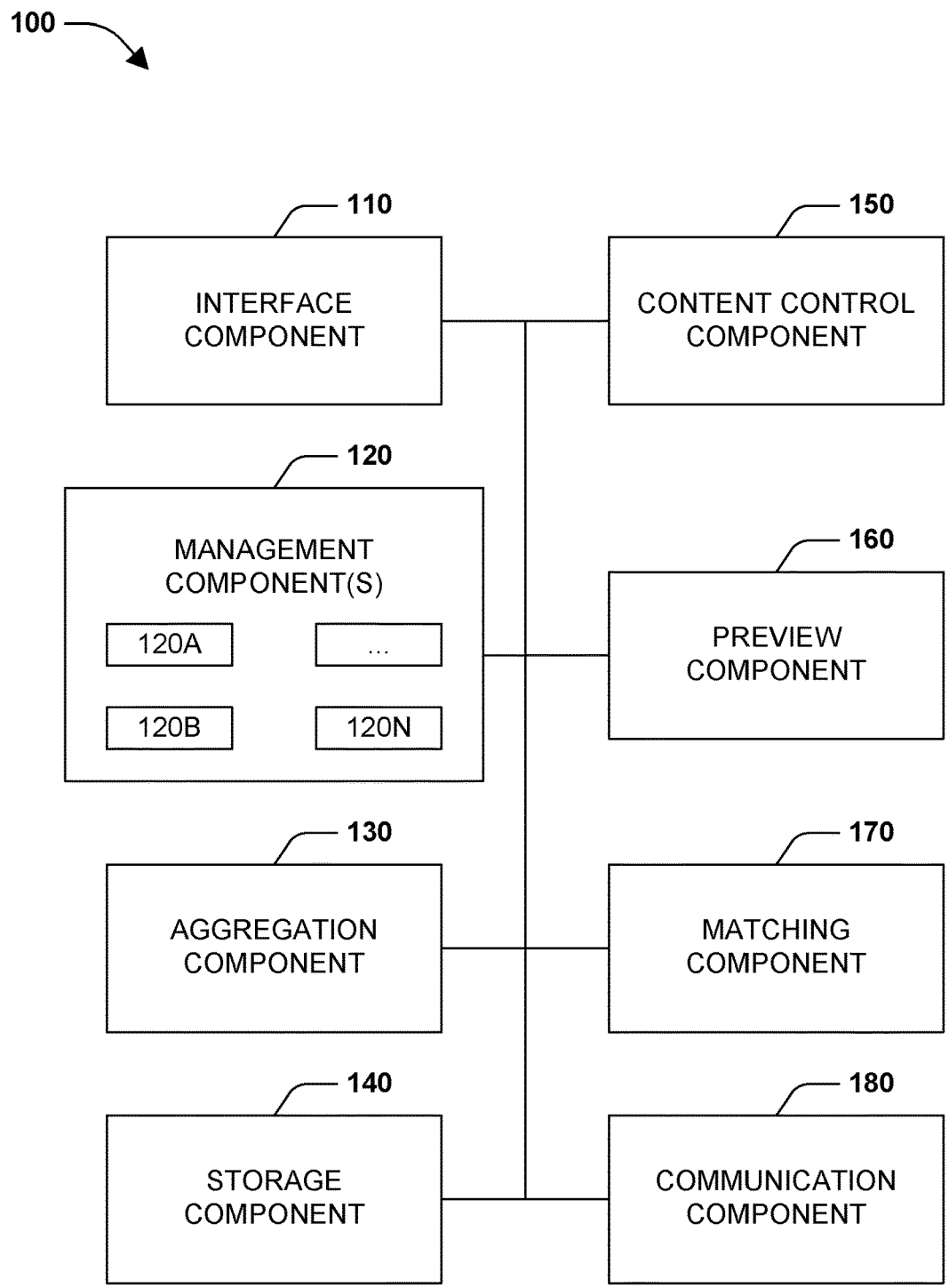
FIG. 1 is an illustration of an example component diagram of a system for profile management, according to one or more embodiments.

Embodiments, or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 6:
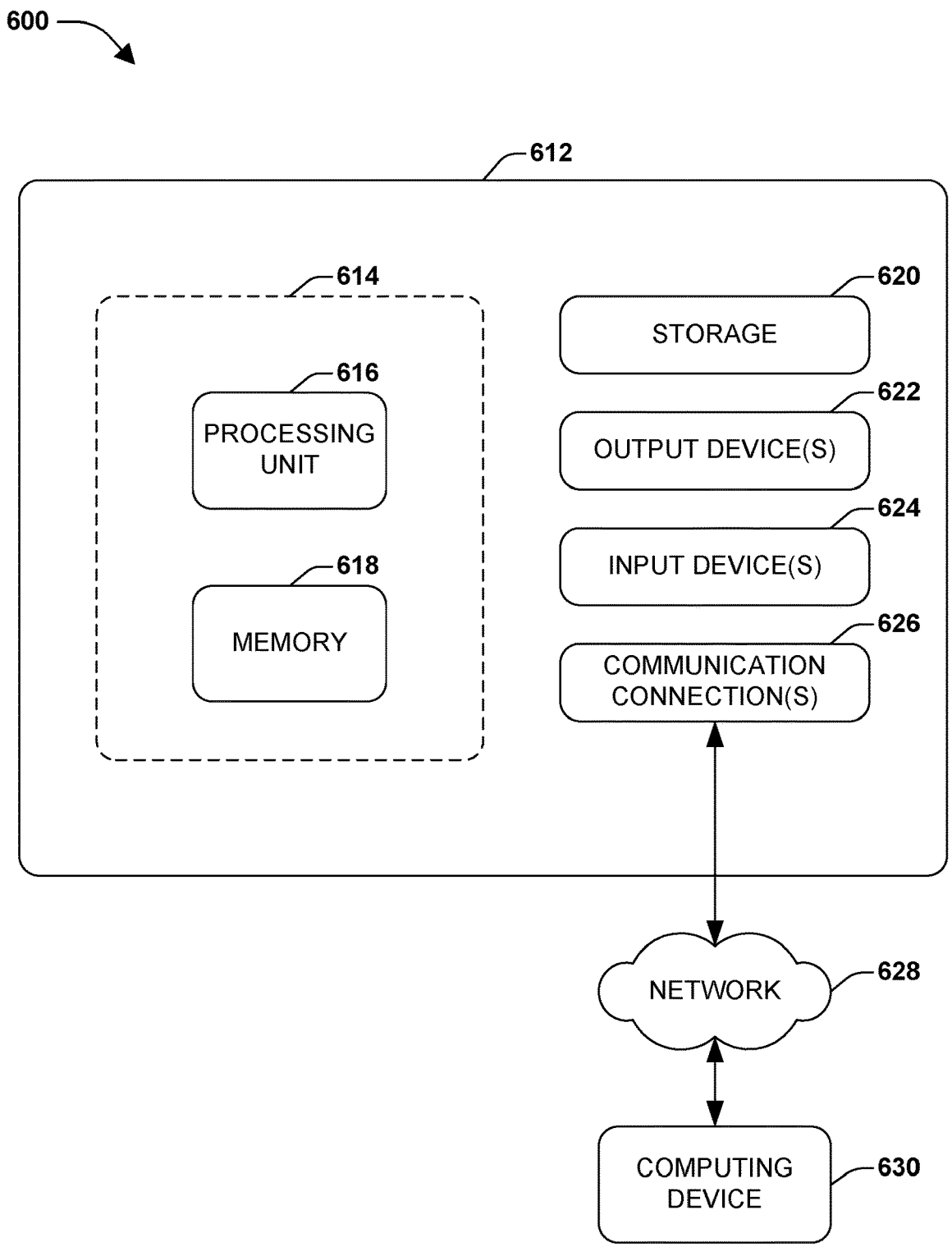
FIG. 6 is an illustration of an example computing environment where one or more of the provisions set forth herein are implemented, according to one or more embodiments.

For one or more of the figures herein, one or more boundaries, such as boundary 614 of FIG. 6, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

The following terms are used throughout the disclosure, the definitions of which are provided herein to assist in understanding one or more aspects of the disclosure.

As used herein, an entity may include a user, an individual, a party, a profile owner, a profile moderator, a profile contributor, a business, a corporation, an enterprise, a government, an organization, an employer, an administrator, an administration, etc.

As used herein, a profile may include information, content, data, etc. associated with one or more entities, such as a first entity. Additionally, a profile may be comprised of one or more portions. The information, content, or data contained within or included in the profile may be associated with one or more other entities, such as a second entity. In other words, one or more portions of the profile may have content regarding or pertaining to another entity. As an example, an individual may create a profile or personal profile. This profile may be indicative of information related to or associated with the individual, but not necessarily limited to the individual. In some scenarios, portions of information within the profile of the individual may include information related to an organization which employs that individual (e.g., an employer or a contracting organization).

Because this information may be related to or associated with an entity other than the individual, control over management of the profile of the individual may be given to one or more entities, such as a second entity. Examples of information which may relate to or be associated with another entity, an additional entity, such as a second entity, may include projects the individual is currently working on, projects which the individual has worked on in the past, future projects, classified information, internal documents, unreleased documents, prototypes, trade secret information, other information which an employer or an entity may not wish to become public, etc.

As mentioned, it will be appreciated that the second entity or additional entity may not desire that one or more portions of information associated with a profile of the first entity or individual to be made public. For example, in a scenario where the first entity is an employee of a company and the second entity is the company, the company may not want day to day details of a project released on a profile for the employee until that project has been launched. Perhaps the company would prefer that merely the codename (e.g., Project Longhorn, Project Revolution, etc.) for the project be made public. In other words, the company may not be opposed to releasing information, partial information, limited information, or portions of information regarding information associated with the company or projects on which the employee is working. Accordingly, profile management may facilitate control of release of these portions of information, which may be posted publicly on the profile of the employee, for example.

As used herein, the term managing may include adding, providing, modifying, updating, deleting, removing, posting, sharing, controlling, etc. access to one or more portions of a profile or one or more portions of content, data, or information associated with a profile. In other words, managing may mean or include different types of control over a profile.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

FIG. 1 is an illustration of an example component diagram of a system 100 for profile management, according to one or more embodiments. The system 100 may include an interface component 110, one or more management components 120, an aggregation component 130, a storage component 140, a content control component 150, a preview component 160, a matching component 170, and a communication component 180.

Additionally, the management component 120 may include one or more sub-components or otherwise enable multiple parties or entities to manage a profile of an entity. For example, a first management component 120A may allow a first entity to manage one or more portions of a profile. A second management component 120B may allow a second entity to manage one or more portions (e.g., which may or may not overlap or be in common with portions associated with the first management component 120A) of the same profile. Regardless, one or more management components 120A, 120B, 120C . . . 120N (e.g., where N may be most any integer or number) may allow most any number of users or entities to manage, access, or control portions of a profile or the same profile or one or more profiles.

The interface component 110 may provide an interface, such as a graphical user interface (GUI), which enables one or more entities to interface with a system 100 for profile management. Different interfaces may be provided for different entities based on permissions or degrees of control associated with respective entities. For example, an entity who is the owner of a profile may be provided with a first interface, while an entity who is a profile moderator may be provided with a second interface which enables the moderator to supplement or manage one or more portions of the profile. The first interface may have different functionalities or capabilities from the second interface, which enable different levels of control, modification, editing, moderating, etc. To this end, the interface component 110 may provide a variety of interfaces, including a front end interface (e.g., a profile creation interface), a back end interface (e.g., a content control interface, a preview interface, etc.), a search interface (e.g., which utilizes the matching component 170), a matching interface, etc.

As an example, a front end interface may be provided by the interface component 110 to facilitate profile creation. The front end interface may enable a user or an entity to add, modify, update, delete, remove, or otherwise manage content or information associated with a profile, such as a profile for a first entity or a profile of a user. In one or more embodiments, the interface component 110 may be initialized or employed by one or more management components 120, 120A, 120B . . . 120N, etc. When a first entity creates a profile (e.g., utilizing management component 120), the first management component 120A may employ the interface component 110 to provide the first entity with a front end interface which guides the first entity through a profile setup process. For example, the interface component 110 may provide a front end interface which includes one or more fields for information to be filled out by the first entity. Examples of information or fields may include name, address, contact information, telephone number, email address, website, location, employer, division of organization, job title, pay scale, etc. Additionally, the interface component 110 may allow the first entity to upload supplemental content, such as graphics, images, multimedia connect, etc. to their profile.

Additionally, the interface component 110 may provide other interfaces, such as a back end interface, which may be implemented to enable an additional entity, such as a second entity, to manage one or more aspects or one or more portions of a profile. For example, after a first entity creates a profile having one or more portions, a second entity may utilize the back end interface to control or otherwise manage one or more portions of the profile. A profile, as previously discussed, may include one or more portions, content, data, information, and the like. Again, the managing may include controlling access to the profile, adding content, editing content, removing content, maintaining the profile, managing visibility settings associated with the profile, etc. In this way, the back end interface provided by the interface component 110 may be utilized to screen one or more portions of a profile from the public, one or more entities, etc. Explained another way, the back end interface may act as a privacy settings manager in one or more embodiments.

The management component(s) 120 may enable users or entities to manage profiles in a variety of different ways. For example, a first management component 120A may facilitate profile creation by ordering the interface component 110 to render a front end interface for profile creation. The first management component 120A may enable a user or entity to engage in profile creation by allowing a user, entity, individual, profile owner, etc. to add, modify, update, delete, remove, control access to, share, or manage content, data, information, etc. associated with one or more portions of a profile. The profile may be associated with an entity, such as a first entity or a profile owner. In one or more embodiments, the first management component 120A may be accessible by merely the profile owner or a super user (e.g., a user with root access), for example. It will be appreciated that the profile owner may not be granted root access or super user access in all scenarios because content of a profile may relate to or pertain to entities other than the profile owner. To this end, the content control component 150 may generate one or more determinations as to which entities have access to which portions of a profile, as will be discussed in greater detail herein.

In one or more embodiments, the first management component 120A may track one or more sets of rights associated with an entity with respect to one or more portions of a profile (e.g., where the profile is associated with a profile owner or a first entity). Rights associated with portions of a profile may be determined by the content control component 150 and based on profile headers or content within portions of the profile. Generally, the profile owner or first entity has multiple rights associated with the profile of the profile owner (e.g., first entity). For example, the profile owner may generally add, remove, update, modify, control access, etc. or otherwise manage the profile as seen fit or as desired. In other words, the profile owner or the first entity may have a large amount of control over content, data, or information associated with his or her profile relative to other entities, for example.

The profile owner or first entity may have the right to add, modify, update, delete, remove, share, control access, or manage most portions of his or her profile. The first management component 120A may enable the first entity or profile owner to create or shape a profile in most any way the first entity sees fit. However, according to one or more aspects, other parties or other entities, such as additional entities or a second entity, may have input or control which may supersede or overlap with one or more management rights, permissions, or rights of the profile owner. For example, a second entity may have input or control over one or more portions of a profile when the respective portions of the profile relate to or are associated with the second entity. In other words, when a profile of a first entity has content associated with a second entity, the second entity may have power or control over portions of the profile of the first entity which relate to or are associated with the second entity (e.g., employee profile relating to unreleased project described by a codename).

Here, the content control component 150 may analyze one or more portions of the profile to determine which portions of a profile are subject to access by an entity. In other words, the content control component 150 may determine that a first portion of a profile or associated content 'belongs' to a first entity and assigns read, modify, write access to the first entity for the first portion of the profile. The content control component 150 may determine that a second portion of a profile relates to a first entity and a second entity and assign the first entity write access and the second entity modify access, for example.

It will be appreciated that a first entity may have a higher level of access than a second entity for a portion of a profile, the second entity may have a higher level of access than a first entity for a portion of a profile, or the first entity and the second entity may have equal levels of access or overlapping access (e.g., which is not necessarily equal). In a scenario where the first entity and the second entity have equal levels of access or overlapping access, a first entity may add content to a portion of a profile and the second entity may remove that content. When the second entity removes the content, the communication component 180 may provide notification to the first entity regarding the modification to the profile, which will be described in greater detail herein. In other embodiments, the first entity may have the right to approve changes or modifications suggested by a second entity.

The management component 120 may include a second management component 120B which may enable additional users or entities to manage one or more portions of a profile created by or associated with a first entity. In one or more embodiments, the profile of the first entity may be created by the first entity utilizing a front end interface provided by the interface component 110. In other embodiments, the profile of the first entity may be created by an entity other than the first entity, such as a second entity. Regardless, the second entity may be an organization or an employer of an individual (e.g., the first entity). As discussed herein, an employee (e.g., the first entity) may create or post information, data, or content on his or her profile.

The system 100 may be implemented in a business setting or a business environment where the second entity, organization, or employer may not wish for one or more portions of a profile, associated content, information, data, etc. to be made public. Examples of scenarios where a second entity may not wish information to be public may include sensitive information, trade secrets, internal documents, employee evaluations, or other confidential information. Here, the content control component 150 may determine one or more portions of the profile of the first entity which are associated with the second entity and grant the second entity access to manage those respective portions of the profile. Here, the second management component 120B may allow the second entity (e.g., an employer) to delete, modify, control, restrict, or otherwise manage access to content, data, or information within the profile of the first entity or employee. The second management component 120B may enable the employer to manage portions of the profile associated with the employer, such as projects, duties, day to day activities of the employee, etc.

In this way, the management component 120 or the second management component 120B may enable one or more entities to manage or control one or more portions of content, data, information, etc. of a profile of a first entity or a profile associated with a first entity (e.g., even in a scenario when the profile is created by the first entity). Accordingly, the second entity may manage (e.g., via the second management component 120B) content of the profile of the first entity. In one or more embodiments, the interface component 110 may provide a corresponding back end interface or content control interface.

The second management component 120B may employ the interface component 110 to provide the second entity with an interface to manage the profile (e.g., the profile of the first entity or the profile created by the first entity). For example, the interface component 110 may provide a back end interface which provides content controls for screening, restricting, or controlling access to content (e.g., a drop down menu with one or more options for one or more portions of a profile, such as public, private, semi-private, etc.). This drop down menu may be provided for one or more portions of the profile to maintain privacy settings for corresponding portions of the profile.

Additionally, the second management component 120B may enable the second entity to add or provide additional content, information, or data for one or more portions of the profile for the first entity. In this way, a profile for a user or a first entity may be setup or configured such that two or more entities may contribute or manage content associated with the same profile (although the profile may be technically 'owned' by the first entity). It will be appreciated that the second management component 120B, the third management component, additional management components, etc. may have similar capabilities or a subset of capabilities of one or more other management components, such as the first management component 120A. In other words, the second management component 120B may perform identical functions as the first management component 120A in some scenarios or have different functionality in other scenarios.

It will be appreciated, however, that in one or more scenarios, the additional content contributed by the second entity may be added to the profile pending approval from the first entity. In other words, the second management component 120B may have the communication component 180 notify the first entity that one or more additional entities, such as the second entity, have managed or altered one or more aspects of the profile for the first entity. In one or more embodiments proposed content may be added or suggested by the second entity via the second management component 120B, and the first management component 120A may thus employ the interface component 110 to provide an interface to approve one or more of the changes. In some scenarios the first entity may merely be notified of changes or modifications made by a second entity, while in other scenarios, the first entity may have the right to approve such changes via an interface provided by the interface component 110.

Accordingly, the interface component 110 may provide a back end interface for the first entity to approve changes to the profile for the first entity. Here, the back end interface may have one or more check boxes next to one or more of the changes, additions, deletions, etc. proposed by the second entity to allow the first entity to accept, decline, or modify one or more of the changes.

The first entity may utilize the back end interface to modify a suggested change or proposed content provided by the second entity. If a change to a portion of a profile is modified (e.g., via a first entity), the second management component 120B may relay the suggested modification to the second entity. This process may be iterative or back and forth and may occur until one or more of the entities accepts, declines, or rejects one or more of the changes.

As discussed, a management component 120, such as the second management component 120B may manage one or more rights associated with an entity with respect to one or more portions of a profile (e.g., a profile associated with a first entity or a profile owner). The second entity may have some control over content, data, or information within the profile of the first entity. In one or more embodiments, a management component 120, such as the second management component 120B may maintain, discover, or manage one or more rights of an entity (e.g., a second entity or additional entity) with respect to one or more portions of content, data, or information within a profile of a first entity based on a relationship between the first entity and the additional entity or second entity, a role of the additional entity, a status of the additional entity, content, information, or data, associated with the additional entity, or a nature of a portion of a profile, etc.

For example, a section of a profile or a portion of a profile may be entitled, "Current projects" or "Stuff I'm working on". In this example, a second entity, such as an employer, may have full, unfettered access to this portion of the profile due to the nature of the content within this portion of the profile. In other words, because this portion or section of the profile is work related (e.g., as determined by the content control component 150), the employer or second entity may retain or be granted one or more rights to manage this portion of the profile by the second management component 120B or the content control component 150. The content control component 150 may detect when one or more portions of a profile are relevant to a second entity based on one or more aspects, such as keywords, project names, image recognition, tags, etc. In one or more embodiments, the content control component 150 may grant the second entity one or more rights based on the role of the second entity as the employer of the individual or first entity or based on an employer-employee relationship between the first entity and the second entity.

In one or more embodiments, additional management components may be provided, as seen in FIG. 1. For example, the system 100 may include a third management component, a fourth management component, an Nth management component 120N, etc. These additional management components may be utilized by additional entities to manage one or more aspects of a profile. In other words, the additional management components may enable one or more additional entities, such as a third entity, a fourth entity, etc. to manage content in a manner similar to the first management component 120A, the second management component 120B, a subset or combination of management components 120A or 120B, etc. In this way, one or more of the additional management components, such as a third management component or a fourth management component, etc. may allow one or more additional entities, such as a third entity, a fourth entity, etc. to respectively add, remove, modify, update, control, or otherwise manage one or more portions of a profile, such as a profile of a first entity. Accordingly, the profile of the first entity may be 'owned' by the first entity, but updated or managed by several entities based on the content within the profile.

One or more of the management components 120A, 120B, additional management components, etc. may have limited or different functionalities or capabilities than the first management component 120A or the second management component 120B. For example, a management component may assign rights to an entity and provide corresponding capabilities based on a role of an entity, a degree of separation between a first entity and a second entity, etc. In this way, one or more of the management components may have different capabilities than one or more of the other management components. In other words, not necessarily all of the management components will have the same capabilities with regard to managing a profile, such as a profile of a first entity.

Further, the interface component 110 may provide different entities with different interfaces based on or according to rights associated with corresponding management components or corresponding entities. For example, the interface component 110 may provide an additional entity, such as a second entity (e.g., utilizing a second management component 120B), with a back end interface which enables the second entity to preview a profile of the first entity. The back end interface may also provide content control via the content control component 150. This allows the second entity to manage one or more portions of a profile pertinent to the second entity, for example.

Various embodiments with different entities managing various portions of a profile are contemplated herein. For example, a profile may be created by a first entity (e.g., utilizing the first management component 120A) and include a first portion and a second portion. In one or more embodiments, the second management component 120B may enable a second entity to add additional content to the first portion, but not the second portion. In other embodiments, the first entity may be granted control over the first portion and the second entity control over the second portion (e.g., after creation of the profile). In yet other embodiments, the first entity may update content of the first portion of the profile (e.g., via the first management component 120A) and the second entity may control access to content within the first portion of the profile (e.g., via the second management component 120B, interface component 110, and content control component 150).

For example, the interface component 110 may provide the second entity with a content control interface having one or more privacy control settings, tags, groups, access level, etc. The content control component 150 may adjust visibility of associated or corresponding content accordingly. The content control component 150 may grant the second entity access to control content based on subject matter described within the content. For example, if the first entity modifies or edits the content within the first portion of his or her profile such that the content is no longer related to the second entity or falls below a threshold disclosure level, the content control component 150 may remove access to control rights from the second entity for the first portion of the profile.

Conversely, the content control component 150 may grant the second entity access to control rights when content pertaining to or owned by the second entity is added, edited, or modified to be included within a portion of a profile. For example, if a first entity describes an idea (e.g., owned or to be assigned to an enterprise, corporation, business, second entity, etc.) which is undergoing the process of being submitted as a patent, the second entity may be granted access to control that portion of the content. Further, the content control component 150 may automatically hide such content from public view. In other words, a default setting for work related content may be hidden, for example. In this way, a third entity, such as an entity from the general public may not have access to the portion of the profile associated with a patent application. For example, the third party may merely be presented with a title of the patent application and a patent pending notification until details pertaining to the patent application are made public.

The aggregation component 130 may aggregate or collect content, data, information or supplemental content, data, or information from one or more sources. For example, the aggregation component 130 may aggregate data from profiles of other entities, social networks, internal sources, email, storage, locally from a computer, web history, etc. The aggregation component 130 may add one or more portions of this information to a profile of a user or have the communication component 180 send one or more entities a request to add the content to a profile. In one or more embodiments, multiple entities may be required to provide consent in order for content to be posted or added to a profile. For example, if the aggregation component 130 collects content related to a project an individual (e.g., employee is currently working on), a request may be sent to the individual (e.g., a first entity) as well as the employer (e.g., a second entity) or administration. In this way, the aggregation component 130 may aggregate information, additional content, or supplemental content, such as project an individual or entity has worked on in the past or is currently working on, for the profile of an entity (e.g., first entity or employee).

The storage component 140 may store content, data, information, additional or supplemental content, data, or information of one or more profiles (or portions thereof) for one or more entities. Additionally, the storage component 140 may house one or more rights, privileges, access, or control properties for one or more of the entities for respective portions of one or more of the profiles.

The content control component 150 may enable one or more entities to manage visibility or rights associated with one or more portions of a profile. For example, when a management component provides an entity one or more content control rights for a profile, the content control component 150 may be employed to control access to one or more portions of a profile or one or more portions of content, data, information, etc. within a profile. The management component may employ the content control component 150 and the interface component 110 to render a back end interface which enables an entity, such as a second entity, to control or manage content of a profile (e.g., of a first entity). For example, a user may utilize the back end interface to select one or more content control options. As a result, the content control component 150 may apply visibility settings to one or more portions of a profile in accordance with a selected option. Explained another way, content control may be provided to enable an additional entity to control content, such as content related to or owned by an organization with which an entity is employed. As another example, when an employee retires from a company or organization, the content control component 150 may enable an entity (e.g., administrator) to set the profile of the retired employee to dormant or other appropriate status. Examples of other statuses may include public, private, internal, dormant, suspended, etc.

The content control component 150 may generate one or more determinations regarding one or more portions of a profile, where a determination may be indicative of one or more entities which may be impacted or associated with content within a respective portion of a profile. In other words, if a first entity posts content related to a second entity, the content control component 150 may recognize that the post or content within the post relates to the second entity as well as the first entity. To this end, the communication component 180 may send the second entity a notification regarding the post or corresponding content. Further, in one or more embodiments, a management component, such as the second management component 120B, may have the interface component 110 render an interface for managing at least some of the content within the profile.

The preview component 160 may have the interface component 110 generate or render a preview interface for one or more entities. For example, the preview component may enable one or more entities, one or more parties, or one or more additional entities to preview a profile according to one or more different access settings (e.g., public, private, internal, etc.). In one or more embodiments, the preview component 160 may enable an entity or user to view a profile as the general public would view it, for example. To this end, the preview component 160 may be utilized in a scenario where a first entity is associated with a first organization and a second entity is associated with a second organization, thereby enabling the system 100 to be utilized in a cross-enterprise setting. In other words, the system 100 may cause interface component 110 to generate a first interface for entities associated with a first organization and a second interface for entities associated with a second organization.

As an example, entities or user associated with the first organization may utilize the preview component to generate a preview of how a profile would appear for entities or users of the second organization. In other words, the system 100 and preview component 160 may allow individuals to build a profile which may be viewed from a perspective of the first organization, the second organization, both the first organization and the second organization, from a public perspective, or from a perspective associated with neither the first organization nor the second organization.

The matching component 170 may match or pair an entity with one or more opportunities based on the profile associated with the entity and a description or attributes associated with one or more of the opportunities. The matching component 170 may utilize one or more search capabilities, such as by searching based on a location, physical location, willingness to travel, strengths, weaknesses, desires, goals, achievements, awards, experience, etc. associated with an entity, individual, opportunity, etc. In this way, pairing or matching functionality may be provided such that useful, meaningful, actionable data may be provided. In one or more embodiments, an opportunity may include a mentorship opportunity and the matching component 170 may match profiles of mentors with profiles of mentees.

The matching component 170 may facilitate partnerships within an organization by matching or pairing an entity with another entity (e.g., a second entity, a mentor, or a mentee). The matching component 170 may engineer or build a mentoring program by generating multiple mentor-mentee pairings in an automated fashion, rather than by utilizing typical processes (e.g., utilizing human resources man-power, etc.), thereby providing a social networking aspect for the system 100 of profile management.

The matching component 170 may pair an entity (e.g., a first entity) with a mentor when the entity has a profile which indicates that the entity has less experience than a mentor. For example, if the mentor has a profile, the matching component 170 may compare corresponding portions of potential mentor-mentee profiles, such as with regard to a subject, expertise, or area of interest. To this end, an entity who has expressed an interest in a subject may be paired (e.g., via the matching component 170) with another entity who has indicated an expertise in that subject. Similarly, the matching component 170 may pair an entity with a mentee when the entity has a profile which indicates the entity is experienced with regard to a subject (and is willing to be a mentor). The matching component 170 may pair such an individual or entity with a mentee associated with a profile which indicates that the mentee has an interest in the subject, has little experience with the subject, is in a job role where experience in the subject may be useful, has a desire to learn about the subject, etc.

In one or more embodiments, the matching component 170 may facilitate diversity mentorship. For example, the matching component 170 may utilize a search engine with one or more search capabilities. The matching component 170 may analyze attributes or content within one or more portions of a profile and attributes of one or more opportunities, such as location, preferences, interests, goals, job title, skills associated therewith, reviews from past mentorships, etc. For example, if multiple individuals or entities share a common mentor, one or more of the individuals may provide feedback or anonymous feedback for the mentor, which may be stored in the storage component 140 and utilized by the matching component 170 for future matching, pairing, or reference. In other words, if a mentee has a bad experience with a mentor, feedback may be provided, stored, and utilized for future mentor-mentee matching or pairing. Explained another way, the matching component 170 may learn based on feedback and may utilize one or more matching algorithms to generate search results, pairings, or matching, for example.

The matching component 170 may track progress during a mentorship, gains associated with a mentorship or mentor-mentee relationship, analyze skill gaps, needs, etc. based on a profile of an entity or feedback provided to the system 100. Feedback may be provided to a feedback interface rendered by interface component 110 and stored within the storage component 140. In this way, skill gaps associated with an entity or an individual may be mitigated. It will be appreciated that the matching component 170 does not necessarily match individuals to other individuals. For example, the matching component 170 may match an individual or an entity with an opportunity to decrease a skill gap, such as a class, for example. In this way, contents of a resume of an individual may be provided as an input to the system 100 and the matching component 170 may return one or more learning opportunities for the individual. In these embodiments, the interface component 110 may render a search interface or a matching interface which enables a user to select one or more goals, such as learning, skill gap enhancement, job placement, mentorship, etc. to match the individual or entity with an appropriate opportunity.

In other embodiments, the search interface may be utilized to search for job talent, where the storage component 140 houses a database of profiles of job candidates, for example. Further, the search interface may be implemented cross-enterprise such that details relating to confidential aspects are not disclosed or public to a searching entity, for example. Yet another application of the system 100 may include matching capital or angel investors with business ventures, suppliers with vendors, funding sources, human capital, international programs, exchange programs, projects with resources, etc. Further, the matching component 170 may facilitate matching to different needs, such as diversity and inclusion. In one or more embodiments, the matching component 170 may provide summaries across departments, vendors, targets, analytics, one or more profiles, etc.

The matching component 170 may provide suggestions, such as a "you may like" suggestion for an individual or entity utilizing a matching or search interface rendered by the interface component 110. Negative matching may be provided in a similar fashion. For example, the matching component 170 may indicate "you may wish to avoid" suggestions based on attributes in a profile of an entity and aspects or attributes associated with one or more opportunities. An individual (e.g., first entity) may be allergic to smoke, dogs, or have other interests which may be indicated by content in one or more portions of his or her profile. Even if another individual (e.g., second entity) has common interests or complementary features (e.g., knowledge of a subject which interests the first entity) based on a profile of the second entity, the matching component 170 may consider the allergies of the first entity or individual while generating a mentor-mentee pairing, for example. Here, the matching component 170 may indicate that the individual with allergies may wish to avoid being paired with the second individual, for example. Of course, suggestions may be based on reputation, personality types, other features, etc. For example, the matching component 170 may indicate to an entity that they may not wish to conduct or do business with one or more additional entities based on matching or differences between the profile of the entity and the profile of one or more of the additional entities.

The matching component 170 may be utilized to facilitate employment opportunities or career navigation. For example, identify potential career paths where entity or team member may be successful based on profile or interests. The matching component 170 may determine one or more potential career paths based on a time investment for an entity or a time investment for an organization, one or more associated risks, etc.

The matching component 170 may plan career navigation or career paths based on one or more relationships between one or more entities. For example, if two entities work well together or have left mutual positive feedback, the matching component 170 may provide similar career placement for one or more of the individuals. As another example, if a first individual or first entity gets along well (e.g., provides positive feedback for) with a second individual, and the second individual gets along with the third individual, the third individual may be introduced to the first individual.

In this way, the matching component 170 may facilitate career navigation (e.g., where my career go), career placement, career goals, positioning identification, cross enterprise, cross business engagements, lines of business, job families, job requirements, talent management, talent search, performance improvement, skill gap identification (e.g., what is missing based on comparison against individuals with comparable experience, etc.), competencies, inclusive environment, enhanced team member engagements.

The communication component 180 may enable or disable automatic data processing or communication between the system 100 for profile management and one or more other systems (not shown). Here, the profile management system 100 may be a central system which acts as a clearing house or supports one or more platforms associated with career navigation, mentoring, sponsorship, skill gap, talent searching, etc. for a line of business or for a goal. The profile management system 100 may operate independently of other systems and facilitates translation or communication of data or information between one or more of the other systems. The communication component 180 may identify one or more characteristics of a system in communication with the profile management system. For example, the communication component 180 may identify a type of system, a language associated with a system.

This enables consolidation, processing of data or content associated with profile across different platforms, enterprises, technologies, devices, web browsers, operating systems, languages (e.g., power shell, visual basic, C++, C sharp, Java, Ajax), etc. In other words, a profile management system 100 may support portability in a technology agnostic manner. The communication component 180 may interpret a language utilized by a system in communication with the profile management system 100 and generate a mapping to one or more other systems in communication with the profile management system 100 to facilitate communication between the system 100 and the other system. To this end, the communication component 180 may enable a profile to be portable such that the profile may be brought from one platform to another.

In one or more embodiments, the communication component 180 may enable a profile to be leveraged online or offline (e.g., synchronize offline changes to the profile when connected online). The communication component 180 may also be utilized by one or more parties or additional entities to access a profile or matching functionality. For example, if a first entity has a profile, a second entity may add additional content to first portion of profile, a third entity may request action or help from first entity. Here, the communication component 180 may control access from third entity according to a subscription. In this way, a subscription may capitalize on existing customers, vendors, distributors, etc.

Figure 2:
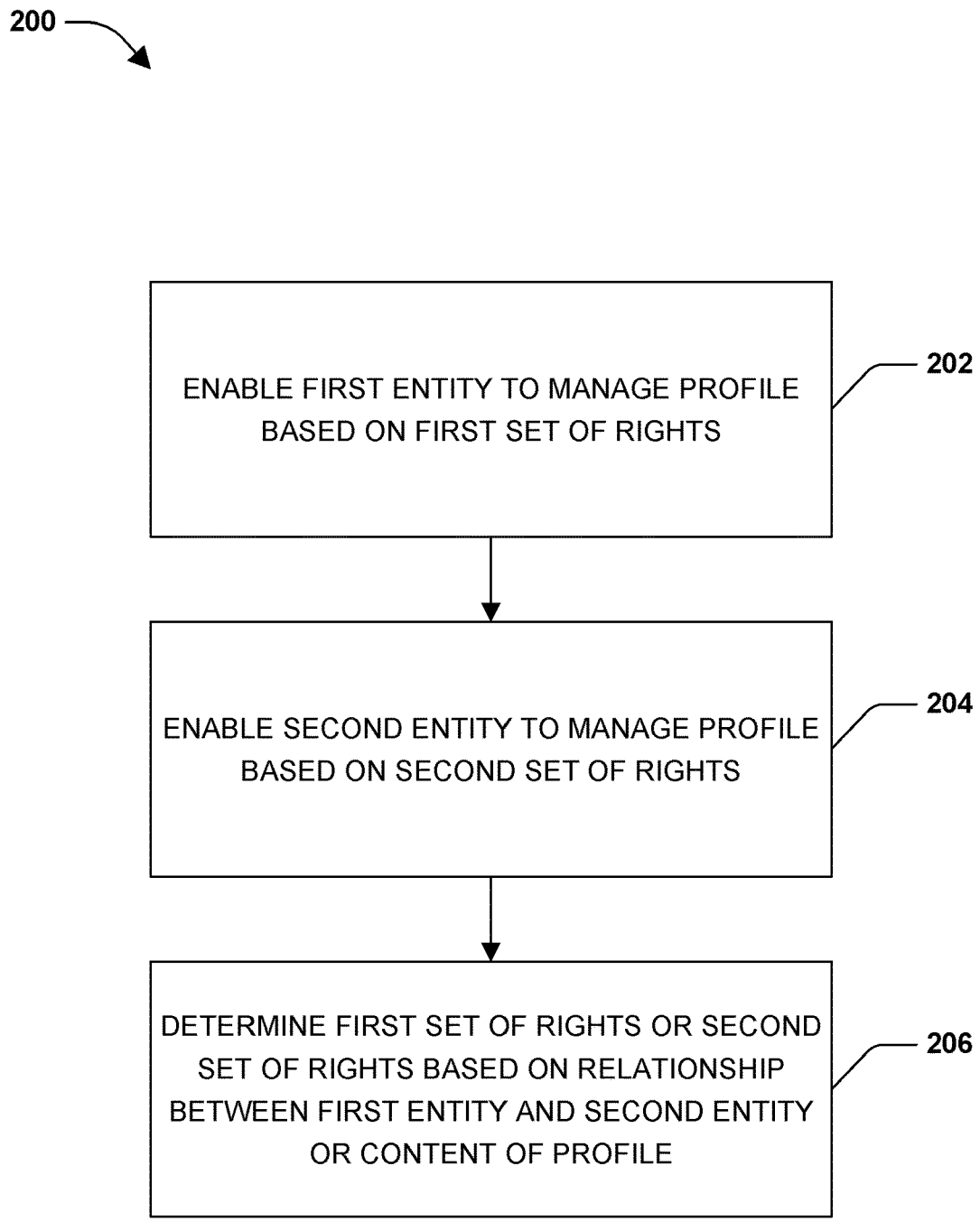
FIG. 2 is an illustration of an example flow diagram of a method for profile management, according to one or more embodiments.

FIG. 2 is an illustration of an example flow diagram of a method 200 for profile management, according to one or more embodiments. At 202, the method 200 includes enabling a first entity to manage a profile based on a first set of rights (e.g., management rights). At 204, a second entity may be enabled or permitted to manage one or more portions of a profile based on a second set of rights (e.g., different than the first set of rights). At 206, the method 200 may include determining the first set of rights or the second set of rights based on a relationship between the first entity and the second entity or content from one or more portions of the profile.

Figure 3:
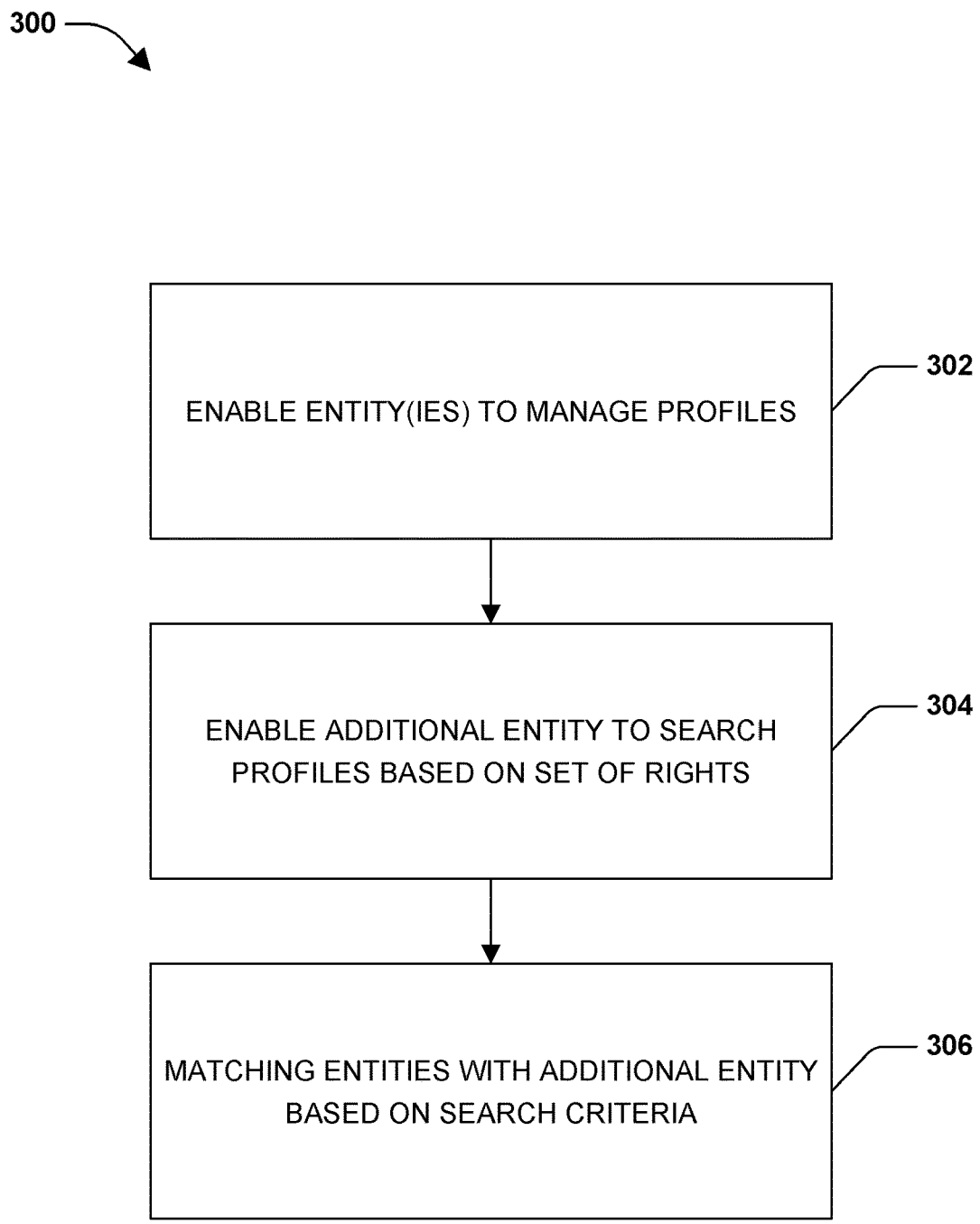
FIG. 3 is an illustration of an example flow diagram of a method for profile management, according to one or more embodiments.

FIG. 3 is an illustration of an example flow diagram of a method 300 for profile management, according to one or more embodiments. At 302, one or more entities may be allowed or enabled to manage one or more profiles. At 304, an additional entity may be provided with tools to search one or more of the profiles based on a set of rights. At 306, one or more of the entities may be matched with the additional entity based on search criteria.

Figure 4:
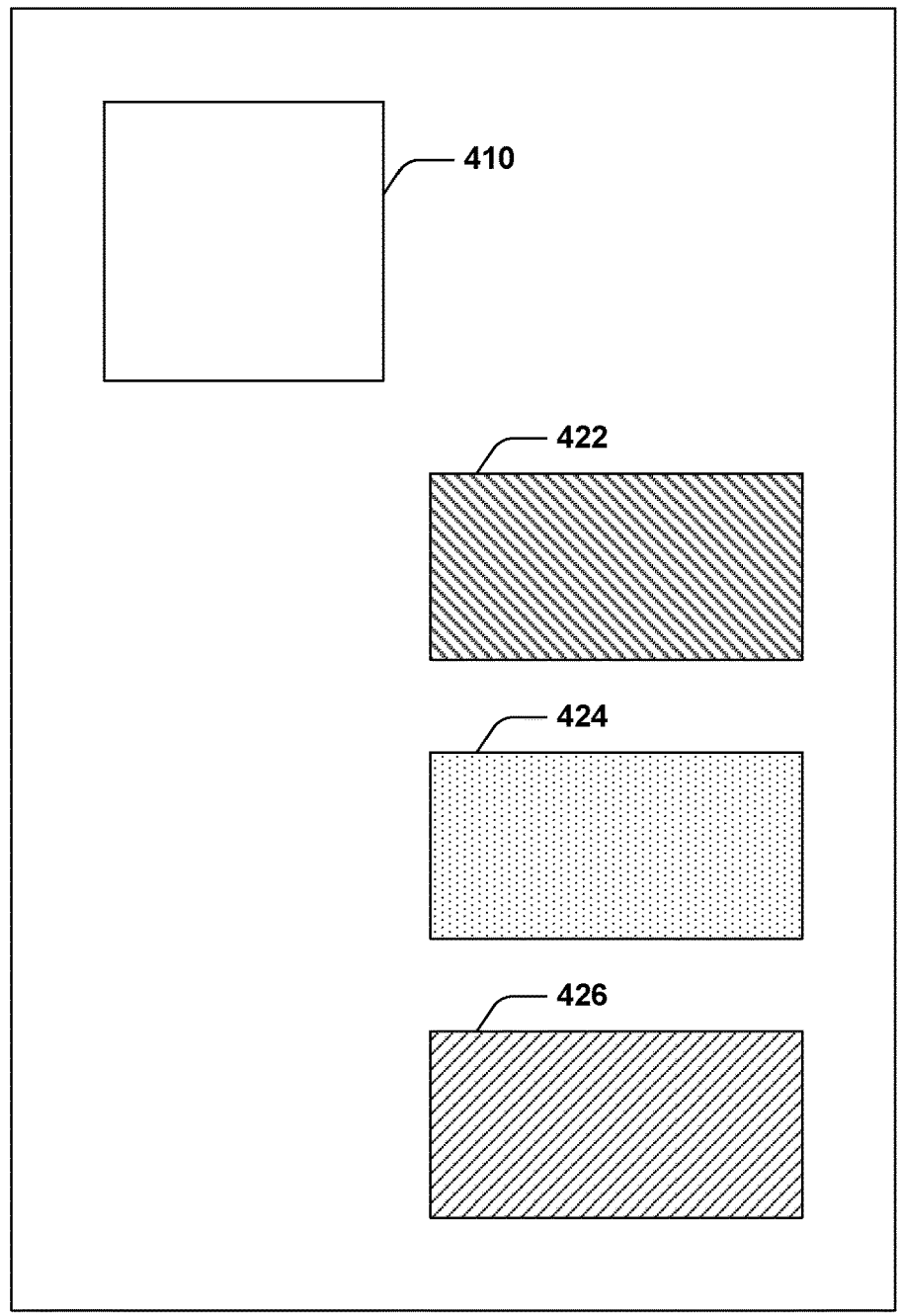
FIG. 4 is an illustration of an example profile associated with profile management, according to one or more embodiments.

FIG. 4 is an illustration of an example profile 400 associated with profile management, according to one or more embodiments. The profile 400 may include profile media 410, such as one or more profile pictures. Additionally, a profile may include one or more portions 422, 424, 426, etc. Respective portions 422, 424, and 426 may be managed by one or more entities. For example, a first entity may manage portions 422, 424, and 426. A second entity may manage portion 426 based on content contained within portion 426. In one or more embodiments, if the content within 426 changes or is modified (e.g., such that the content is outside a scope of access rights for the second entity), the second entity may have access rights to manage portion 426 revoked. However, if the content 426 is modified to fall within the scope of access rights, the second entity may be granted the right to manage portion 426.

One or more embodiments may employ various artificial intelligence (AI) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

Figure 5:
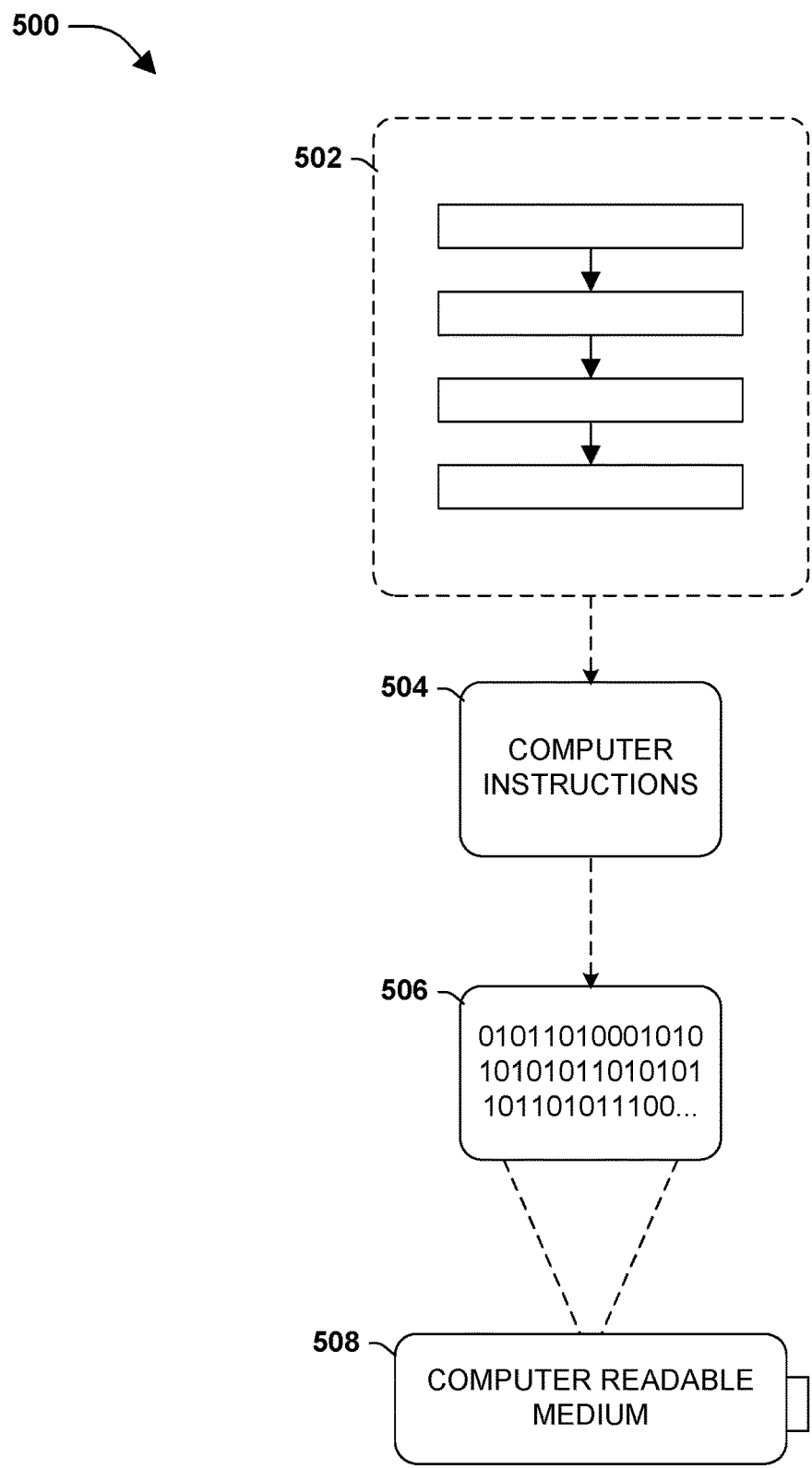
FIG. 5 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This computer-readable data 506, such as binary data including a plurality of zero's and one's as shown in 506, in turn includes a set of computer instructions 504 configured to operate according to one or more of the principles set forth herein. In one such embodiment 500, the processor-executable computer instructions 504 may be configured to perform a method 502, such as the method 200 of FIG. 2 or the method 300 of FIG. 3. In another embodiment, the processor-executable instructions 504 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 6 and the following discussion provide a description of a suitable computing environment to implement embodiments of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one or more embodiments provided herein. In one configuration, computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other embodiments, device 612 includes additional features or functionality. For example, device 612 may include additional storage such as removable storage or non-removable storage, including, but not limited to, magnetic storage, optical storage, etc. Such additional storage is illustrated in FIG. 6 by storage 620. In one or more embodiments, computer readable instructions to implement one or more embodiments provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 612. Any such computer storage media is part of device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 612 includes input device(s) 624 such as keyboard, mouse, pen, voice input device, touch input device, infrared cameras, video input devices, or any other input device. Output device(s) 622 such as one or more displays, speakers, printers, or any other output device may be included with device 612. Input device(s) 624 and output device(s) 622 may be connected to device 612 via a wired connection, wireless connection, or any combination thereof. In one or more embodiments, an input device or an output device from another computing device may be used as input device(s) 624 or output device(s) 622 for computing device 612. Device 612 may include communication connection(s) 626 to facilitate communications with one or more other devices.

According to one or more aspects, a system for profile management is provided, including a first management component, a second management component, and a content control component. The first management component may enable a first entity to manage one or more portions of a profile according to a first set of rights. The second management component may enable a second entity to manage one or more portions of the profile according to a second set of rights different than the first set of rights. The content control component may determine the first set of rights or the second set of rights based on content of one or more portions of the profile.

In one or more embodiments, the system may include an interface component providing a first interface for the first entity based on the first set of rights and a second interface for the second entity based on the second set of rights. The system may include an aggregation component collecting content for the profile from one or more sources. The system may include a storage component storing the profile, one or more portions of the profile, the first set of rights, or the second set of rights. The system may include a preview component previewing the profile for the first entity, the second entity, or a third entity based on the first set of rights, the second set or rights, or a third set or rights, respectively.

The system may include a matching component enabling the second entity to search one or more portions of the profile based on the second set of rights. Additionally, the system may include a communication component notifying the first entity of one or more management actions taken by the second entity with respect to one or more portions of the profile or a communication component notifying the second entity of one or more management actions taken by the first entity with respect to one or more portions of the profile. The first entity may be an employee and the second entity may be an employer. Managing may include adding, providing, modifying, updating, deleting, removing, posting, sharing, or controlling content, data, or information associated with the profile.

According to one or more aspects, a method for profile management is provided, including enabling a first entity to manage one or more portions of a profile according to a first set of rights, enabling a second entity to manage one or more portions of the profile according to a second set of rights different than the first set of rights, and determining the first set of rights or the second set of rights based on a relationship between the first entity and the second entity. The method may include collecting content for the profile from one or more sources, previewing the profile for the first entity, the second entity, or a third entity based on the first set of rights, the second set or rights, or a third set or rights, respectively, enabling the second entity to search one or more portions of the profile based on the second set of rights, or matching the first entity with one or more opportunities based on one or more portions of the profile and one or more attributes associated with one or more of the opportunities. One or more of the opportunities may be a mentorship relationship between the first entity and one or more additional entities.

According to one or more aspects, one or more of the following are provided: enabling one or more entities to manage one or more portions of one or more profiles, enabling an additional entity to search one or more portions of one or more of the profiles based on a set of rights, matching one or more of the entities with the additional entity based on search criteria of the additional entity, previewing the profile for the additional entity. One or more of the entities may be a vendor and the additional entity may be a supplier. Alternatively, one or more of the entities may be a supplier and the additional entity may be a vendor (e.g., searching for a supplier).

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system implemented at least partially by hardware, comprising:
   a processor coupled to a memory that stores instructions that when executed by the processor cause the processor to:
      generate a profile based on information provided by a first entity, the provided information including personal information related to and managed by the first entity and additional information related to and managed by a second entity associated with the first entity, wherein
         at least one portion of the additional information is confidential and sensitive information of the second entity,
         the second entity is granted control of the portion of the profile with the confidential and sensitive information,
         the granted control comprises a set of rights determined based on a relationship between the first entity and the second entity, and
         the determined set of rights supersedes a set of rights associated with the first entity;
      match the first entity with one or more additional entities based on profiles of the first entity and the one or more additional entities and potential for a beneficial relationship between the first entity and the one or more additional entities; and
      notify the first entity of the match, wherein the notification is processed by a communication component that
         identifies a type of a computing system of each of the first entity, the second entity, and the one or more additional entities, and
         constructs the profile to be portable to the type of the computing system of each of the first entity, the second entity, and the one or more additional entities.

2. The system of claim 1, wherein the instructions further cause the processor to determine the match based on interest in a subject and difference in experience captured with regard to the subject to connect mentors with mentees, wherein the interest in the subject and the difference in experience are determined from profile information.

3. The system of claim 1, wherein the instructions further cause the processor to perform one or more of limiting public access to the at least one portion of the additional information based on the determined set of rights of the second entity or matching the first entity with the second entity based on search criteria specified by the first entity.

4. The system of claim 1, wherein the instructions further cause the processor to update the profile based on input by the first entity, wherein public access is controlled by the second entity.

5. The system of claim 1, wherein the instructions further cause the processor to remove the control of the portion of the profile by the second entity based on a change to the portion of the profile.

6. The system of claim 1, wherein the instructions further cause the processor to collect additional content related to the first entity from a social network service or web history and update the profile with the additional content.

7. The system of claim 1, wherein the instructions further cause the processor to generate a negative suggestion of something to avoid based on profile attributes.

8. The system of claim 1, wherein the instructions further cause the processor to notify the first entity of actions taken related to modification of the profile by the second entity.

9. The system of claim 1, wherein the first entity represents a business venture and the one or more additional entities correspond to potential investors.

10. A method, comprising:
    executing on a processor instructions stored in a memory that cause the processor to execute operations comprising:
       generating a profile based on information provided by a first entity, the provided information including personal information related to and managed by the first entity and additional information related to and managed by a second entity associated with the first entity, wherein
          at least one portion of the additional information is confidential and sensitive information of the second entity,
          the second entity is granted control of the portion of the profile with the confidential and sensitive information,
          the granted control comprises a set of rights determined based on a relationship between the first entity and the second entity, and
          the determined set of rights supersedes a set of rights associated with the first entity;
       matching the first entity with one or more additional entities based on profiles of the first entity and the one or more additional entities and potential for a beneficial relationship between the first entity and the one or more additional entities; and
       notifying the first entity of the match, wherein the notification is processed by a communication component that
          identifies a type of g computing system of each of the first entity, the second entity, and the one or more additional entities, and
          constructs the profile to be portable to the type of the computing system of each of the first entity, the second entity, and the one or more additional entities.

11. The method of claim 10, wherein the matching is based on interest in a subject and difference in experience captured with regard to the subject to connect mentors with mentees, wherein the interest and the difference are determined from profile information.

12. The method of claim 10, wherein the operations further comprise limiting public access to the at least one portion of the additional information based on the determined set of rights of the second entity.

13. The method of claim 10, wherein the operations further comprise updating the profile based on input by the first entity, wherein public access is controlled by the second entity.

14. The method of claim 10, wherein the matching comprises matching the first entity with the one or more additional entities based on search criteria specified by the first entity.

15. The method of claim 10, wherein the operations further comprise collecting additional content related to the first entity from a social network service or web history and updating the profile with the additional content.

16. The method of claim 10, wherein the operations further comprise generating suggestions based on profile attributes.

17. A non-transitory computer-readable storage medium storing executable instructions that, in response to execution, cause a system comprising a hardware processor to perform operations, comprising:
  generating a profile based on information provided by a first entity, the provided information including personal information related to and managed by the first entity and additional information related to and managed by a second entity associated with the first entity, wherein at least one portion of the additional information is confidential and sensitive information of the second entity,
  the second entity is granted control of the portion of the profile with the confidential and sensitive information,
  the granted control comprises a set of rights determined based on a relationship between the first entity and the second entity, and
  the determined set of rights supersedes a set of rights associated with the first entity;
  matching the first entity with one or more additional entities based on profiles of the first entity and the one or more additional entities and potential for a beneficial relationship between the first entity and the one or more additional entities; and
  notifying the first entity of the match, wherein the notification is processed by a communication component that
    identifies a type of a computing system of each of the first entity, the second entity, and the one or more additional entities, and
    constructs the profile to be portable to the type of the computing system of each of the first entity, the second entity, and the one or more additional entities.

18. The non-transitory computer-readable storage medium of claim 17, wherein the matching is based on interest in a subject and difference in experience captured with regard to the subject to connect mentors with mentees, wherein the interest and the difference are determined from profile information.

19. The non-transitory computer-readable storage medium of claim 17, wherein the operations further comprise limiting public access to the at least one portion of the additional information based on the determined set of rights of the second entity.

20. The non-transitory computer-readable storage medium of claim 17, wherein the operations further comprise collecting additional content related to the first entity from a social network service or web history and updating the profile with the additional content.

* * * * *

UNITED STATES PATENT AND TRADEMARK OFFICE
CERTIFICATE OF CORRECTION

PATENT NO. : 11,281,797 B1
APPLICATION NO. : 16/551308
DATED : March 22, 2022
INVENTOR(S) : Lawrence T. Belton, Jr. et al.

It is certified that error appears in the above-identified patent and that said Letters Patent is hereby corrected as shown below:

In the Claims

Column 20, Line 52, replace "identifies a type of g computing system of each of the" with -- identifies a type of computing system of each of the --.

Signed and Sealed this
Twenty-seventh Day of August, 2024

*Katherine Kelly Vidal*

Katherine Kelly Vidal
*Director of the United States Patent and Trademark Office*